US012190794B2

(12) United States Patent
Gatsios et al.

(10) Patent No.: US 12,190,794 B2
(45) Date of Patent: Jan. 7, 2025

(54) LIGHTING ARRANGEMENT WITH A CONTROL UNIT AND TWO LED LIGHTING MODULES, EACH COMPRISING AN LED MATRIX

(71) Applicant: HELLA GmbH & Co. KGaA, Lippstadt (DE)

(72) Inventors: Sebastian Gatsios, Arnsberg (DE); Florian Herold, Bielefeld (DE); Dirk Kliebisch, Paderborn (DE); Ingo Moellers, Rietberg (DE); Alexander Schwan, Kamen (DE); Patrick Vogel, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/217,272

(22) Filed: Jun. 30, 2023

(65) Prior Publication Data

US 2024/0005849 A1 Jan. 4, 2024

(30) Foreign Application Priority Data

Jul. 1, 2022 (DE) ..................... 10 2022 116 512.4

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01)

(58) Field of Classification Search
CPC ...... G06F 3/041–047; G06F 2203/041–04114; G06F 3/1446;
(Continued)

(56) References Cited

U.S. PATENT DOCUMENTS 11,324,087 B1 * 5/2022 Kreuter .................. H05B 45/14
2016/0121213 A1 * 5/2016 Choi ..................... A63F 13/803 463/31

(Continued)

FOREIGN PATENT DOCUMENTS

DE 10048440 A1 9/2000
DE 102006014800 A1 10/2007
DE 102015102533 A1 8/2016

*Primary Examiner* — Sanjiv D. Patel
(74) *Attorney, Agent, or Firm* — Muncy, Geissler, Olds & Lowe, P.C.

(57) ABSTRACT

A lighting arrangement with a control unit and two LED lighting modules, each comprising an LED matrix. Control information, including an image signal for generating a light image, can be generated with the control unit for each lighting module, and the light image can be generated with the LED matrix of each lighting module, which the control unit has generated for this lighting module. The control unit is connected to the lighting modules for the transmission of the image signals. The first lighting module has a processing unit and a first interface via which the information for the lighting modules can be extracted from the signal generated by the control unit. The processing unit provides the information intended for the second lighting module at the first interface of the first lighting module, and wherein the second lighting module is connected to the first interface of the first lighting module.

8 Claims, 1 Drawing Sheet

(58) Field of Classification Search
CPC .................... G06F 1/1652; G06F 3/147; G06F 2203/04102; G09F 9/3026; G09F 9/301; G09F 9/33; G09G 2300/026; G09G 2380/02; H05K 1/028
See application file for complete search history.

(56) References Cited

U.S. PATENT DOCUMENTS

| | | | |
|---|---|---|---|
| 2019/0197934 A1 | 6/2019 | El Idrissi et al. | |
| 2019/0353336 A1* | 11/2019 | Kreuter | H04L 12/40045 |
| 2019/0387197 A1* | 12/2019 | Balcioglu | H03K 23/48 |
| 2021/0124542 A1* | 4/2021 | Yin | G09G 5/006 |

* cited by examiner

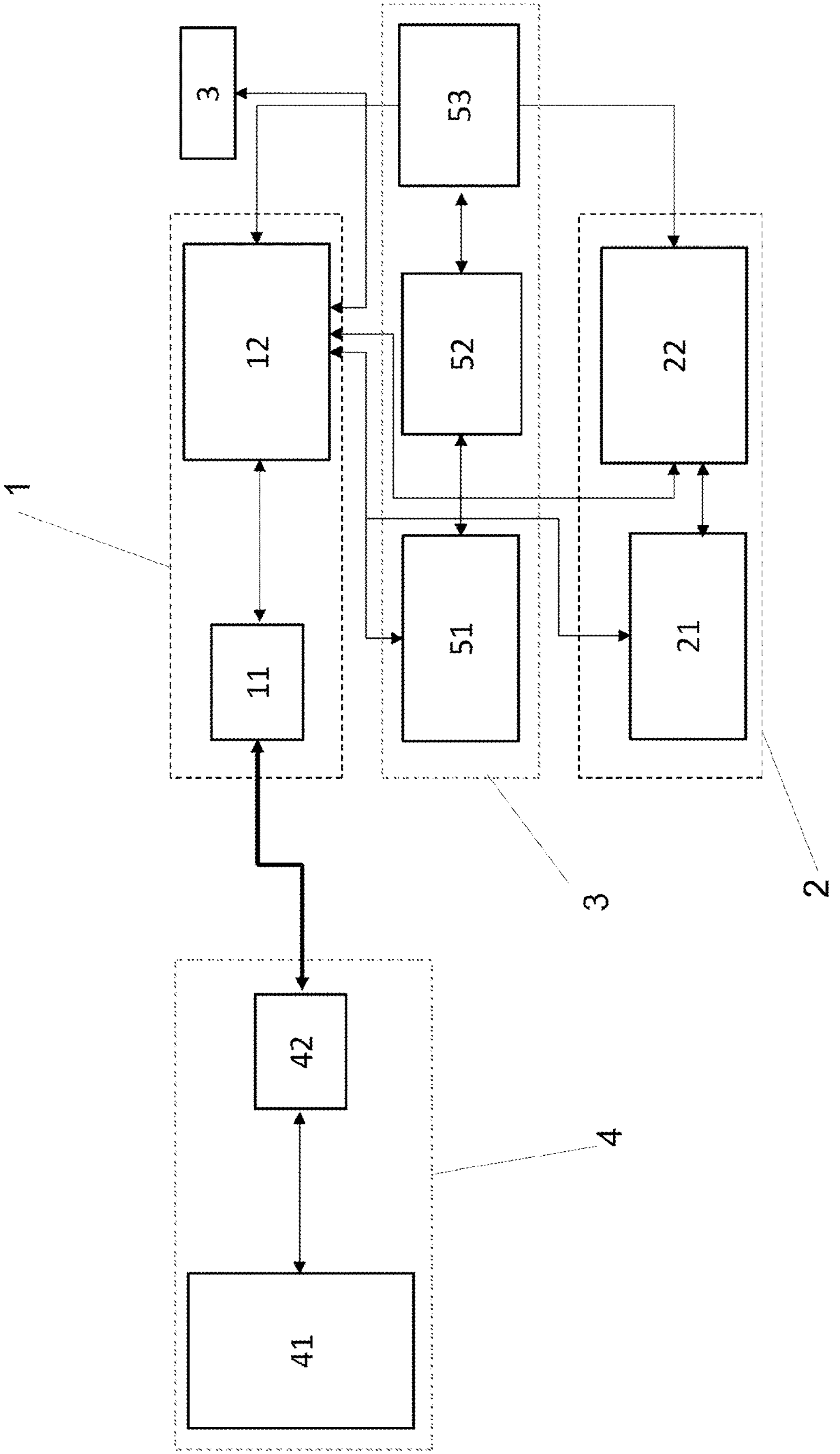
3
53
12
52
22
1
11
51
21
3
2
42
4
41

LIGHTING ARRANGEMENT WITH A CONTROL UNIT AND TWO LED LIGHTING MODULES, EACH COMPRISING AN LED MATRIX

This nonprovisional application claims priority under 35 U.S.C. § 119(a) to German Patent Application No. 10 2022 116 512.4, which was filed in Germany on Jul. 1, 2022, and which is herein incorporated by reference.

BACKGROUND OF THE INVENTION

Field of the Invention

The present invention relates to a lighting arrangement with a control unit and two LED lighting modules, each comprising an LED matrix, wherein an image signal for generating a light image can be generated with the control unit for each lighting module and the light image, which the control unit has generated for this lighting module, can be generated with the LED matrix of each lighting module, wherein the control unit is connected to the lighting modules for the transmission of the image signals.

Description of the Background Art

A lighting arrangement is known from document US 2019/197934 A1. It discloses several variants of such a lighting arrangement. In one variant, each of the lighting modules is connected to the control unit. This has the disadvantage that long cables have to be laid, especially for lighting modules that are far away from the control unit. In contrast, in a variant with lighting modules far away from the control unit, in which the lighting modules are adjacent to each other, shorter cables are sufficient if only a first lighting module is connected to the control unit and the second lighting module is connected to the first lighting module. According to the teaching of document US 2019/197934 A1, a signal is generated by the control unit, which includes, among other things, the image signals for both lighting modules. This signal, coming from the control unit, is transmitted from the first lighting module to the second lighting module. Each of the two lighting modules then extracts the information that is important to it from the signal, in particular the image signal intended for it. This information, including the image signals, must then be fed to various units responsible for processing in the lighting modules. For example, the image signals are fed to microchips, each of which carries an LED matrix that can be used to generate the desired light image. Other information, such as setpoints for a supply voltage of a power supply for the LED matrix, must be supplied to a power supply.

This concept of a cascade of lighting modules, described in document US 2019/197934 A1, in which all lighting modules receive the same signal, has the property that in each lighting module the information important for the lighting module must be extracted from the signal, while the rest of the information not important for the lighting module is discarded.

SUMMARY OF THE INVENTION

It is therefore an object of the present invention to recover the information contained in the signal generated by the control unit from the signal without discarding any information.

This objective is achieved by the fact that the first lighting module has a processing unit by means of which the information for the lighting modules can be extracted from the signal generated by the control unit, wherein the processing unit provides the information intended for the second lighting module at a first interface of the first lighting module and wherein the second lighting module is connected to this interface of the first lighting module.

This means that only the information that is important for the control of the second lighting module is passed on to the second lighting module. For this purpose, an RGB signal can be provided by the processing unit at the first interface. Thus, the first interface can be an RGB video interface. This can be used to transmit an image signal to generate the light image, which is transmitted by the second lighting module.

The processing unit of the first lighting module can be part of an integrated circuit with which LEDs of the LED matrix of the first lighting arrangement are controlled to generate the light image.

A lighting arrangement according to the invention may have a power supply unit for supplying the first lighting module and the second lighting module with electric current. The power supply unit can provide a constant adjustable and controllable voltage that drives the current to power the modules. This power supply unit can be connected to the first interface of the first lighting module or to a second interface of the first lighting module. The processing unit can extract information from the signal generated by the control unit to control the power supply unit and provide said information on the first or second interface of the first lighting module. This second interface can be a CAN/UART interface. This CAN/UART interface of the first lighting module can be used to establish another connection between the first lighting module and the second lighting module in addition to the connection via the first interface, which can then be used to transmit further information intended for the second lighting module. The second interface of the first lighting module and the associated interfaces of the second lighting module and the power supply unit can be bidirectional interfaces.

A lighting arrangement according to the invention may have one or more peripheral modules, for example, actuators for setting a focal length, an aperture, an orientation of one of the lighting modules. Such a peripheral module can be assigned to one of the lighting modules for its adjustment. The peripheral module may also be connected to the first or second interface of the first lighting module or to a third interface of the first lighting module, and the processing unit may extract information from the signal generated by the control unit to control the peripheral module and provide it to the first, second or third interface of the first lighting module. The third interface can be an SPI interface.

The connection between the control unit and the first lighting module can be a GMSL connection or an Ethernet connection, in particular a 1000Base-T connection or a 100Base-T connection.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE is a schematic block diagram representation of the embodiment.

DETAILED DESCRIPTION

The embodiment has a first lighting module 1, a second lighting module 2, a peripheral module 3, a control unit 4 and a power supply unit 5 that provides an adjustable and controllable constant voltage that drives a current to supply the modules.

The control unit 4 has a microcontroller 41 and an interface 42. Both are interconnected. Via this interface 42, the control unit 4 is connected to the first lighting module 1. For this connection, the first lighting module 1 has an interface 11. For example, the connection can be an Ethernet connection, for example, a 1000Base-T connection, or a GSML connection.

In addition to the interface 11, the first lighting module 1 has an integrated circuit 12 connected to the interface 11, in or on which an LED matrix is arranged. The LEDs of the LED matrix can be controlled by the integrated circuit to create a light image with the LEDs. The integrated circuit 12 has several interfaces, including an RGB video interface as the first interface, a CAN/UART interface as the second interface, and an SPI interface as the third interface.

Via the interface 42 and the interface 11, information, for example control information, image signals, . . . , can be transmitted from the control unit 4 to the integrated circuit 12. This information can be separated by the integrated circuit into information intended for the first lighting module 1, the second lighting module 2, the peripheral module 3, or the power supply unit 5. This information intended for these units 1, 2, 3, 5, if it is not intended for the first lighting module, may be transmitted via the interfaces of the integrated circuit 12 to the second lighting module 2, the peripheral module 3 or the power supply unit 5. Information intended for the first lighting module 1 is processed directly in the integrated circuit 12. An image signal obtained from the information transmitted by the control unit 4 may, for example, be used by the integrated circuit to generate a light image with the LED matrix of the first lighting module 1, as provided for in an image signal of the control unit 4 for the first lighting module 1.

The second lighting module 2 also has an interface 21 and an integrated circuit 22. The interface 21 and the integrated circuit 22 are connected to each other. An LED matrix is arranged in or on the integrated circuit 22. The LEDs of the LED matrix can be controlled by the integrated circuit to create a light image with the LEDs. The integrated circuit 22 has an RGB video interface that is directly connected to the first interface of the integrated circuit 12 of the first lighting module 1. Via this connection, the integrated circuit 22 may obtain an image signal from the integrated circuit 12 of the first lighting module 1, which the integrated circuit 12 of the first lighting module has extracted from the information received from the control unit. The interface 21 of the second lighting module is connected to the second CAN/UART interface of the integrated circuit 12. Via this connection, the integrated circuit 22 of the second lighting module can receive further information from the integrated circuit 12 of the first lighting module, which the integrated circuit 12 of the first lighting module 1 has extracted from the information received from the control unit 4.

The peripheral module 3 has an SPI interface connected to the third interface, the SPI interface, of the integrated circuit 12 of the first lighting module 1. These connections can be used to exchange information between the integrated circuit 12 and the peripheral module 3. In particular, control instructions can be transmitted from the control unit 4 to the peripheral module via the interface 1, the integrated circuit 12 and the third interface of the integrated circuit 12.

A CAN interface 51 of the power supply unit 5 is also connected to the second interface of the integrated circuit 12 of the first lighting module, which also has a microcontroller 52 and a power section 53, which supplies the first lighting module 1 and the second lighting module 2 with the electrical energy necessary for the operation of the integrated circuits 12, 22 and the LED matrices. For this purpose, the microcontroller 52 receives information, in particular control information, from the integrated circuit 12 or from the control unit 4 via the integrated circuit 12 in order to provide the voltage to drive the current required to supply the modules.

Due to the inventive connection of the second lighting module 2, the peripheral module 3 and the power supply module 5 to the control unit via the interfaces of the integrated circuit 12 of the first lighting module 1, the interface 11 of the first lighting module 1, the connection between the interface 11 and the interface 41 of the control unit 4 to the control unit 4, direct lines between the control unit 4 on the one hand and the second lighting module 2, the peripheral module 3 and the power supply unit 5 are unnecessary. By extracting the information intended for the interfaces of the integrated circuit 21 (image signal, control instructions, . . . ), it is unnecessary for the first lighting module 1 to transmit the unchanged signal received from the control unit 4 to the other components of the lighting arrangement.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting arrangement comprising:

a control unit; and first and second LED lighting modules, each comprising an LED matrix, wherein information is generated by the control unit, the information including at least control information and an image signal for each of the first and second lighting modules to generate a light image, wherein the light image is generated by each of the first and second lighting modules, respectively, with the LED matrix of each of the first and second lighting modules, wherein the control unit is connected to the first lighting module for the transmission of the information to the first and second lighting modules, wherein the first lighting module has a processing unit and a first interface, and via the processing unit of the first lighting module, the control information and the image signal for each of the first and second lighting modules is extracted from the information generated by and transmitted to the first lighting module from the control unit, wherein the second lighting module is connected to the first interface of the first lighting module, wherein the processing unit of the first lighting module provides the control information and the image signal that is pertinent to the second lighting module to the second lighting module via the first interface of the first lighting module, wherein the lighting arrangement has at least one peripheral module or actuator for adjusting a focal length, an aperture, or an angular position of one of the first or second lighting modules, wherein the at least one peripheral module or actuator is assigned to the one of the first or second lighting modules, and wherein the at least one peripheral module or actuator is connected to the first interface of the first lighting module, to a second interface of the first lighting module or to a third interface of the first lighting module and the processing unit of the first lighting module extracts information for controlling the at least one peripheral module or actuator from the information generated by and transmitted to the first lighting module from the control unit and provides the information for controlling the at least one peripheral module or actuator to the at least one peripheral module or actuator via the first, second or third interface of the first lighting module.

2. The lighting arrangement according to claim 1, wherein the lighting arrangement has a power supply unit for supplying the first lighting module and the second lighting module with electric current.

3. The lighting arrangement according to claim 2, wherein the power supply unit is connected to the first interface of the first lighting module or to a second interface of the first lighting module and the processing unit of the first lighting module extracts information for controlling the power supply unit from the information generated by and transmitted to the first lighting module from the control unit and provides the information for controlling the power supply unit to the power supply unit via the first or second interface of the first lighting module.

4. The lighting arrangement according to claim 1, wherein the connection between the control unit and the first lighting module is a GMSL connection or an Ethernet connection.

5. The lighting arrangement according to claim 1, wherein the first interface is an RGB video interface.

6. The lighting arrangement according to claim 1, wherein the second interface is a CAN/UART interface.

7. The lighting arrangement according to claim 1, wherein the third interface is an SPI interface.

8. The lighting arrangement according to claim 1, wherein the second interface is a CAN/UART interface.

* * * * *